Sept. 24, 1929.  J. BRADLEY  1,729,026
BALANCE WHEEL
Filed Dec. 4, 1923   2 Sheets-Sheet 1
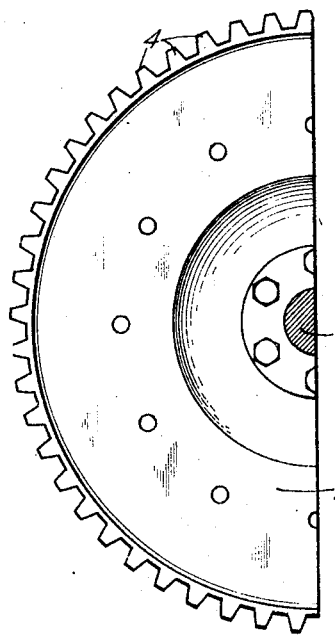
FIG. 2
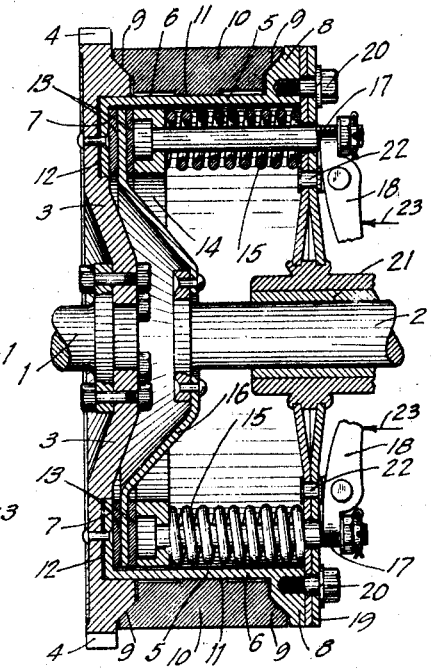
FIG. 1
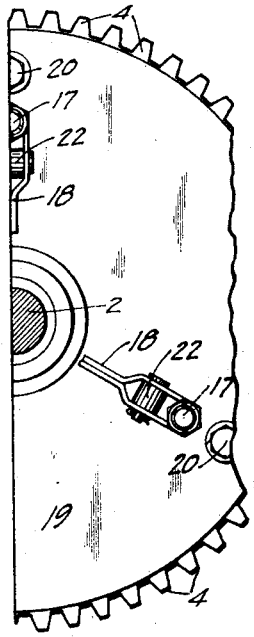
FIG. 3
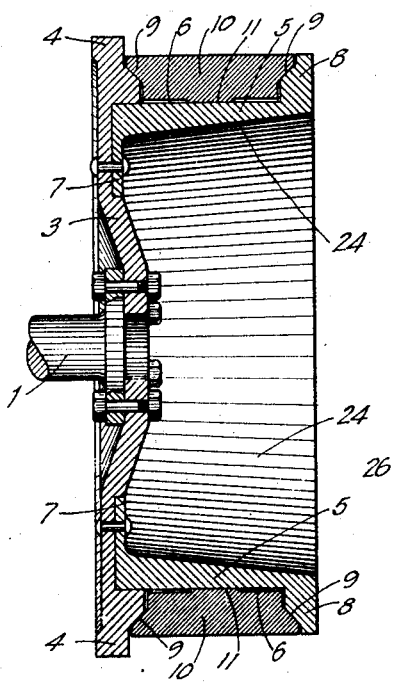
FIG. 4
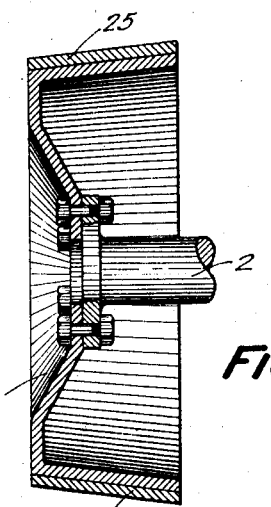
FIG. 5
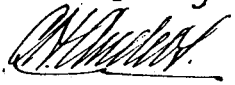
INVENTOR
James Bradley
BY
ATTORNEY Sept. 24, 1929.                J. BRADLEY                1,729,026
                              BALANCE WHEEL
                           Filed Dec. 4, 1923        2 Sheets-Sheet 2

INVENTOR
James Bradley
BY
ATTORNEY

Patented Sept. 24, 1929

1,729,026

UNITED STATES PATENT OFFICE

JAMES BRADLEY, OF ALBANY, NEW YORK, ASSIGNOR OF ONE-FOURTH TO H. WALTER LEE AND ONE-FOURTH TO ROY M. ROBINSON, BOTH OF ALBANY, NEW YORK, ONE-EIGHTH TO HARRY MALLETT, OF SYRACUSE, NEW YORK, AND ONE-EIGHTH TO A. A. LYKER, OF GLOVERSVILLE, NEW YORK

BALANCE WHEEL

Application filed December 4, 1923. Serial No. 678,490.

My invention relates to balance or fly wheels, and more particularly to a device of this general character which is provided with a member of subsantial weight adapted to rotate independently of the shaft to which the device is secured.

The object of my invention is generally to provide a means for reducing vibration and thereby improving the running balance of automotive engines and other prime movers which operate under fluctuating loads and which must be capable of rapid acceleration and retardation.

Another object of my invention is to provide a device of this character which when applied to an internal combustion engine or other prime mover actuated by periodic impulses will, to a certain extent, compensate for variations in the strength of the impulses and facilitate smooth and vibrationless operation.

Another object of my invention is to provide a main balance wheel which will possess all the advantages of a wheel having great peripheral mass without the disadvantages arising from the inertia thereof when starting, accelerating, or retarding.

Another object of my invention is to provide a main balance wheel particularly adapted for application to a motor vehicle which will increase the flexibility of its operation by increasing the rate at which the vehicle may be accelerated or retarded.

Another object of my invention is to provide a device of this character which may be readily combined with a clutch mechanism to form a compact unit adapted to be substituted for the fly wheels now in general use on automotive engines.

A further object of my invention is to provide a device of this character in which the wear upon the bearing surfaces in frictional contact will be minimized, and in which the bearing surfaces will be so arranged as to automatically compensate to some extent for what little wear may occur.

With these general objects in view my invention broadly comprises the provision of independently rotatable members in frictional contact, assembled into a convenient unit for attachment to a shaft, and in the novel construction, arrangement and combination of the elements thereof as herein set forth and claimed.

In the drawings which serve to illustrate my invention—

Fig. 1 is a sectional view of my balance wheel illustrating the application thereto of a plate clutch;

Fig. 2 is a half front elevation of my balance wheel;

Fig. 3 is a half rear elevation;

Fig. 4 is a sectional view of a modified form of my wheel adapted to receive the male member of a cone clutch;

Fig. 5 is a section of the male member of a cone clutch adapted to enter and engage the interior surface of the wheel shown in Fig. 4.

Figure 6:
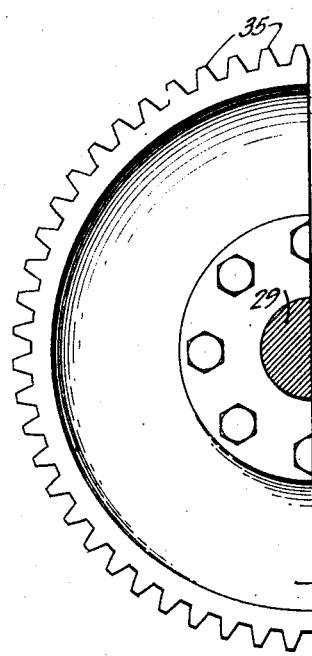
Fig. 6 is a half front elevation of a modified form of my balance wheel adapted for general application to any shaft.

Referring particularly to Figs. 1, 2, 3, 4 and 5, the numeral 1 represents the driving shaft, and 2 represents a shaft adapted to be driven thereby through a clutch mechanism. Fixedly associated with the driving shaft is the member, 3, which is preferably as light in weight as may be consistent with strength and rigidity. When used with an internal combustion engine or other prime mover requiring auxiliary starting mechanism, this member may be provided with gear teeth, 4, to engage the starting means. Fixedly associated with the member, 3, is a member, 5, having an outer, preferably cylindrical, surface, 6, of smaller diameter than the member, 3, and provided at its front end with an inwardly projecting flange, 7, adapted for connection to the member, 3, and at its rear end with an outwardly projecting flange, 8. The front side of the flange, 8, and the rear side of the member, 3, near its periphery, are provided with bearings, 9, preferably conical surfaces, which, with the cylindrical member, 5, form a peripheral channel adapted to receive and retain the floating ring member, 10. The ring member, 10, is provided with bearing surfaces at either side which are complementary to, and are adapted to contact with, the bearing surfaces, 9. The interior of the floating ring is also provided with an annular bearing surface, 11, in contact with the outer surface of member, 5. Inasmuch as the wheel operates in a vertical plane, and there must be some slight play in the bearings, 9 and 11, it will be evident that the actual effective bearing area will be greatest at the top and least at the bottom. In other words, the floating member, 10, is really supported about the top only, on bearing 11, and wedged between bearings, 9, at the side. As bearing, 11, wears, the floating member, 10, drops down slightly so that the wedging effect between the side bearings, 9, is increased and the wear is thus compensated to some extent.

It has been found in practice that a motor vehicle equipped with a main balance wheel of this character may be run many thousands of miles without any noticeable variation in the manner in which the balancing wheel performs the functions for which it is designed. However to provide a convenient means for taking up wear when necessary, a shim, 12, inserted between the member, 3, and the flange, 7, may be removed so as to slightly narrow the peripheral channel and bring the bearings into closer contact.

By reference to Figs. 1 and 4 it will be observed that the floating member, 10, practically forms a heavy rotating rim for the balance wheel, and that the center of gravity of a section thereof is substantially removed from the axis of rotation. By this construction it is obvious that in addition to concentrating the weight of my balancing member at a maximum distance from the center of rotation where it will have the greatest effect, I also provide sufficient space within the member, 5, to accommodate a clutch mechanism.

Figs. 1, 2 and 3 illustrate the application of a plate clutch to my balance wheel. In these figures, 13 represents the clutch rings; 14, the clutch pressure ring; 15, the clutch springs; 16, the clutch plate member which is attached to the driven shaft, 2; 17, the clutch adjusting bolts; 18, the clutch fingers; 19, the clutch cover plate which is attached to the member, 5, by cap screws, 20, and which carries the driven shaft bearing, 21, and the fulcrums, 22, to which the clutch fingers, 18, are pivoted.

It is obvious that when the mechanism is in the position illustrated in Fig. 1, the plate, 16, will be compressed between the rings, 13, and the shaft, 2, will be frictionally driven by shaft, 1. It is also obvious that pressure upon the clutch fingers in the direction of the arrows, 23, will pull the clutch adjusting bolts rearwardly and relieve the pressure upon the clutch rings to effect a disengagement of the driving and driven shaft.

Where my balance wheel is to be used with a cone clutch, the interior surface, 24, of the member, 5, may be conical in form and complementary to the facing or lining, 25, upon the male member, 26.

Figure 7:
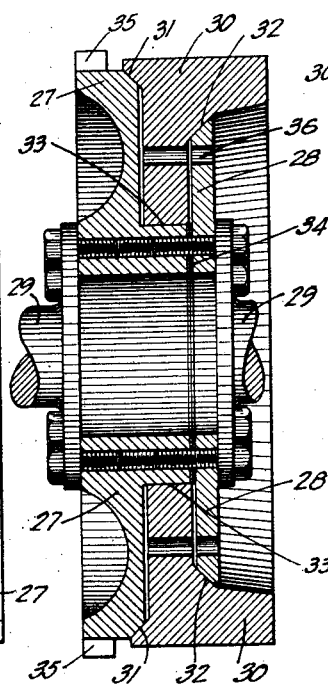
Fig. 7 is a sectional view of the form of wheel shown in Fig. 6.
Figure 8:
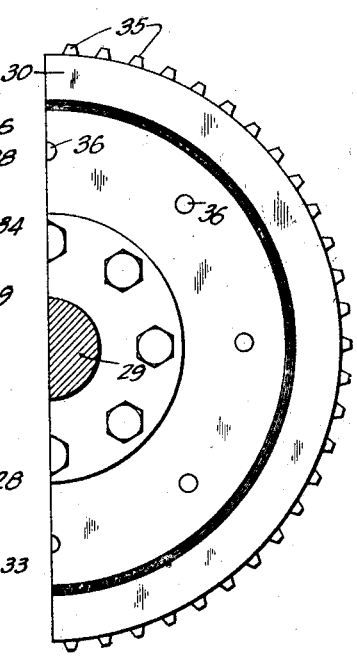
Fig. 8 is a half rear elevation of the form of wheel shown in Figs. 6 and 7.
Figure 9:
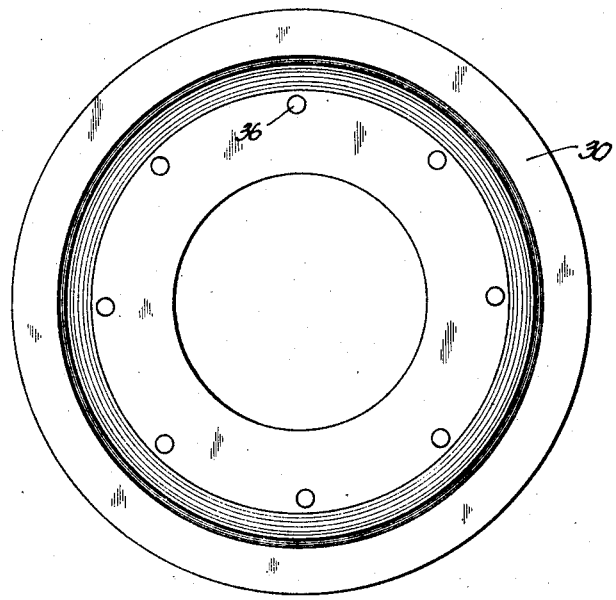
Fig. 9 is a rear elevation of the floating member used in the type of wheel illustrated in Figs. 6, 7 and 8.
Figure 10:
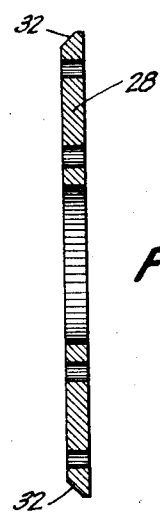
Fig. 10 is a sectional view of the rear thrust bearing plate used in the type of wheel illustrated in Figs. 6, 7 and 8.

The form of my invention illustrated in Figs. 6 to 10 is adapted for general use upon any shaft. It comprises two members, 27 and 28, adapted to be fixed to the shaft, 29. The members, 27 and 28, are spaced apart to provide a circumferential slot or channel adapted to receive the floating member, 30, which rides upon the conical bearing surfaces, 31 and 32, with which the members, 27 and 28, respectively, are provided, and upon the cylindrical bearing, 33. The member, 30, is provided with bearing surfaces complementary to the surfaces, 31 and 32, and adapted to intimately contact therewith. In addition to the conical bearing surfaces, the central portion of the member, 27, is extended in an axial direction to provide a third bearing surface for the member, 30. Removable shims, 34, may be provided between the members, 27 and 28, so that wear upon the side bearing surfaces may be readily taken up when necessary. The periphery of the member, 27, may be provided with teeth, 35, to engage an auxiliary starting mechanism.

My device preferably runs with its lower periphery immersed in oil so that the bearing surfaces are adequately lubricated, and to facilitate this, passages such as illustrated at 36 may be provided to convey oil to the bearing surfaces.

In assembling my device, the pressure upon the bearing surfaces should be so adjusted that the floating member is stiffly rotatable when the shaft is held, or, in other words, so that the inertia of the floating member will hold it stationary for an instant when a sudden torque is applied to the shaft.

From a consideration of the foregoing the advantages of my device should be obvious. It will be apparent that in a comparative sense, the parts of my device which are fixedly associated with the shafts are light, and that the floating member is heavy and has its mass disposed at a considerable distance from the center of rotation. Assuming the parts to be at rest, a sudden starting force applied to the teeth, 4, for example, will cause the member, 3, and all its rigidly connected mechanism to rotate. The heavy floating member, 10, will remain stationary because of its inertia and the slippage of the bearing surfaces. As the rotative speed of the shaft is increased, the friction upon the bearing surfaces will gradually bring the floating member into synchronism with the shaft so that all parts will rotate together as a unit. When the speed of the shaft is accelerated or retarded, the bearing surfaces will slip upon each other and, because the relatively great inertia of the floating member is thus gradually overcome, the rate at which the acceleration or retardation is effected is greatly increased and the resulting vibration is greatly lessened.

I am aware that it has been proposed by others, among whom are Tibbetts in his United States Patent No. 1,257,052, Ofeldt in his United States Patent No. 1,377,849, and Vincent in his United States Patent No. 1,315,058, to dampen the vibrations of a hydrocarbon motor by a frictional damper mounted at the end of the crank shaft remote from the main flywheel, or, in other words, to use a frictional damper in conjunction with a heavy main balance wheel which is rigidly attached to the shaft of the motor.

It is to be understood, as explained above, that such is not my invention. My invention contemplates the replacement of the main flywheel by a unitary device performing the combined functions of a balance wheel and vibration damper. When adapted for use on automotive engines, of such design as will permit, it is intended to be substituted for the ordinary flywheel without substantial change in the design of the clutch or other power transmission features.

To use a frictional vibration damper of this general type on the same shaft to which a heavy balance wheel is rigidly connected, is to reduce or entirely destroy its function, depending, of course, on the ratio of the masses in the two devices. In such a system, the inertia of the rotating flywheel mass which is rigidly attached to the shaft is enormous, and its vibrations cannot be damped by the expenditure of any less energy than is developed by the vibrating mass itself. In my invention, there is no heavy rotating mass rigidly connected to the shaft and vibrating in synchronism therewith. The great mass of the flywheel is in the member, 10. It rotates substantially at the same speed as the shaft but slightly out of synchronism therewith, opposing and damping the torsional vibrations of the shaft rather than augmenting them as in the case of the rigidly attached wheel. In this way the torsional vibrations set up at the crank shaft end opposite the flywheel are materially reduced or eliminated by my invention.

While I have illustrated and described my invention in its preferred embodiment it is obvious that many changes may be made in the details of construction and arrangement without departing from the scope and spirit thereof.

What I claim is—

1. A unitary balance wheel and vibration damper comprising a comparatively light member adapted to be secured to the shaft of an internal combustion engine and provided with a peripheral channel having conical sides converging toward the axis of said member, and a comparatively heavy annular member mounted within said channel and closely fitting the sides thereof but freely and unlimitedly rotatable therein.

2. In an internal combustion engine the combination with a shaft of a single balance wheel comprising a comparatively light member having a peripheral channel with conical sides converging toward the shaft, and a comparatively heavy annular member mounted within said channel in frictional contact with the sides thereof; said first mentioned member being rigidly fixed to said shaft and said annular member being at all times freely and unlimitedly rotatable relative to said first member and frictionally driven thereby.

3. In a balance wheel, the combination with an inner member provided with a peripheral channel having the inner sides thereof converging toward the axis of rotation, of an annular rim member of substantial mass lightly wedged between the sides of said channel; said rim member being at all times unlimitedly rotatable in respect of said inner member but adapted to be frictionally driven thereby.

JAMES BRADLEY.